(12) United States Patent
Kim et al.

(10) Patent No.: US 12,198,646 B2
(45) Date of Patent: Jan. 14, 2025

(54) DISPLAY DEVICE

(71) Applicant: Samsung Display Co., LTD., Yongin-si (KR)

(72) Inventors: Chang Wook Kim, Suwon-si (KR); Chi Wook An, Hwaseong-si (KR); Gun Woo Ko, Seoul (KR); Soon Il Jung, Cheonan-si (KR); Mi Ran Ji, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 156 days.

(21) Appl. No.: 17/981,700

(22) Filed: Nov. 7, 2022

(65) Prior Publication Data

US 2023/0298536 A1 Sep. 21, 2023

(30) Foreign Application Priority Data

Mar. 15, 2022 (KR) ........................ 10-2022-0032238

(51) Int. Cl.
*G02F 1/1335* (2006.01)
*G09G 3/36* (2006.01)

(52) U.S. Cl.
CPC ..... *G09G 3/3607* (2013.01); *G02F 1/133512* (2013.01)

(58) Field of Classification Search
None
See application file for complete search history.

(56) References Cited

U.S. PATENT DOCUMENTS

| | | | | |
|---|---|---|---|---|
| 2011/0123929 | A1* | 5/2011 | Fujita | G03F 7/0007 522/63 |
| 2014/0055330 | A1* | 2/2014 | Park | H10K 59/38 345/88 |
| 2014/0071175 | A1* | 3/2014 | Yang | G09G 3/3208 345/690 |
| 2019/0025635 | A1* | 1/2019 | Chen | G02F 1/136286 |
| 2022/0293051 | A1* | 9/2022 | Liu | H10K 59/12 |

FOREIGN PATENT DOCUMENTS

KR 10-2013-0063478 6/2013

* cited by examiner

*Primary Examiner* — Parul H Gupta
(74) *Attorney, Agent, or Firm* — KILE PARK REED & HOUTTEMAN PLLC

(57) ABSTRACT

A display device includes a substrate, a pixel emitting light, a light blocking layer blocking light, a first pixel row comprising a first pixel group and a second pixel group in a first direction in a plan view, and a second pixel row in a second direction that intersects the first direction and comprising a third pixel group and a fourth pixel group in the first direction. The first pixel group includes a first sub-pixel, a second sub-pixel in a third direction from the first sub-pixel, the third direction intersecting the first direction, and a third sub-pixel in the first direction from the first sub-pixel. The third pixel group may include a sixth sub-pixel, a seventh sub-pixel in the third direction from the sixth sub-pixel, and an eighth sub-pixel in the first direction from the sixth sub-pixel. The third pixel group may be surrounded by the light blocking layer.

20 Claims, 14 Drawing Sheets

EA: EA1, EA2

DISPLAY DEVICE

CROSS-REFERENCE TO RELATED APPLICATION(S)

This application claims priority to and benefits of Korean Patent Application No. 10-2022-0032238 under 35 U.S.C. 119, filed on Mar. 15, 2022 in the Korean Intellectual Property Office, the entire contents of which are herein incorporated by reference.

BACKGROUND

1. Technical Field

The disclosure relates to a display device.

2. Description of the Related Art

With the advancement of the information society, the demand for display devices for displaying images is increasing in various forms. For example, display devices are being applied to various electronic devices such as smartphones, digital cameras, notebook computers, navigation devices, and smart, televisions.

Examples of the display devices include flat panel display devices such as a liquid crystal display (LCD) device, a field emission display (FED) device, a light emitting display device, and the like. Light emitting display devices include an organic light emitting display device including an organic light emitting element, an inorganic light emitting display device including an inorganic light emitting element, and a micro-light emitting display device including a micro-light emitting element.

As display devices are employed by various electronic devices, display devices are desired to have various designs. In a case where the display device is a light-emitting display device, images may be displayed not only on the front surface but also on the side surfaces bent at the four edges of the front surface, respectively. For example, the display device may include a corner disposed between the first side surface bent at a first side edge of the front surface and the second side surface bent at a second side edge of the front surface. In such a display device, a high strain may be applied to the corner due to the double curvature, i.e., the curvature of the first side surface and the curvature of the second side surface. The corner of the display device may include cutting portions and a protrusion pattern for reducing a strain.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device which prevents a color shift that occurs in case that some of the three sub-pixels that produce a color are blocked by the light blocking layer BM and the other pixels may not be blocked in a large viewing angle environment in case that the display device is driven in a private mode.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a display device may include a substrate, a pixel disposed on the substrate and that emits light, a light blocking layer disposed on the pixel and that blocks light, a first pixel row including a first pixel group and a second pixel group arranged in a first direction in a plan view, and a second pixel row disposed in a second direction that intersects the first direction and including a third pixel group and a fourth pixel group arranged in the first direction. The first pixel group may include a first sub-pixel, a second sub-pixel disposed in a third direction from the first sub-pixel, the third direction intersecting the first direction, and a third sub-pixel disposed in the first direction from the first sub-pixel. The third pixel group may include a sixth sub-pixel, a seventh sub-pixel disposed in the third direction from the sixth sub-pixel, and an eighth sub-pixel disposed in the first direction from the sixth sub-pixel. The third pixel group may be surrounded by the light blocking layer.

The second pixel group may include a third sub-pixel, a fourth sub-pixel disposed in the third direction from the third sub-pixel, and a fifth sub-pixel disposed in the first direction from the third pixel. The fourth pixel group may include the eighth sub-pixel, a ninth sub-pixel disposed in the third direction from the eighth sub-pixel, and a tenth sub-pixel disposed in the first direction from the eighth sub-pixel.

The first pixel group and the second pixel group may be alternately disposed in the first pixel row in the first direction.

The fourth pixel group may be surrounded by the light blocking layer.

The third pixel group and the fourth pixel group may be alternately disposed in the second pixel row in the first direction.

The first pixel row and the second pixel row may be alternately disposed in the second direction.

The first pixel row may be in an on state in a first mode and in an off state in a second mode, and the second pixel row is in the on state in both the first and second modes.

Each of the first pixel group, the second pixel group, the third pixel group, and the fourth pixel group may be driven as a unit.

The first pixel group may include a sub-pixel that emits light of red color, a sub-pixel that emits light of blue color, and a sub-pixel that emits light of green color.

The second sub-pixel may emit light of green color.

The second sub-pixel, the fourth sub-pixel, the seventh sub-pixel, and the ninth sub-pixel may emit light of a same color.

The first sub-pixel, the fifth sub-pixel, and the eighth sub-pixel may emit light of a same color.

The third sub-pixel, the sixth sub-pixel, and the tenth sub-pixel may emit light of a same color.

The first sub-pixel and the sixth sub-pixel may emit light of different colors from each other.

According to an embodiment of the disclosure, a display device may include a substrate, a pixel disposed on the substrate and that emits light, a light blocking layer disposed on the pixel and that blocks light, a first pixel group comprising a first sub-pixel, a second sub-pixel, a third sub-pixel, and a fourth sub-pixel, and a second pixel group disposed in a first direction from the first pixel group and comprising a fifth sub-pixel, a sixth sub-pixel, a seventh sub-pixel, and an eighth sub-pixel. The second sub-pixel may be disposed in a second direction from the first sub-pixel, the second direction intersecting the first direction. The third sub-pixel may be disposed in a third direction from the second sub-pixel, the third direction intersecting the second direction. The fourth sub-pixel may be disposed in the third direction from the first sub-pixel. The sixth sub-pixel may be disposed in the second direction from the fifth sub-pixel. The seventh sub-pixel may be disposed in the third direction from the sixth sub-pixel. The eighth sub-pixel may be disposed in the third direction from the fifth sub-pixel. At least one sub-pixel of a plurality of sub-pixels disposed in the first pixel group and the second pixel group in the first direction may be disposed to be spaced apart from the light blocking layer in a plan view.

The third sub-pixel and the fifth sub-pixel may be disposed adjacent to each other in the first direction.

The second sub-pixel, the third sub-pixel, the fourth sub-pixel, and the fifth sub-pixel may be surrounded by the light blocking layer in a plan view.

The first sub-pixel, the third sub-pixel, the fifth sub-pixel, and the seventh sub-pixel may emit light of green color.

The second sub-pixel and the sixth sub-pixel may emit light of a same color, and the fourth sub-pixel and the eighth sub-pixel may emit light of a same color.

The second sub-pixel and the fourth sub-pixel may emit light of different colors from each other.

It should be noted that the effects of the disclosure are not limited to those described above, and other effects of the disclosure will be apparent from the following description.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

It will be understood that the terms "connected to" or "coupled to" may include a physical or electrical connection or coupling.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
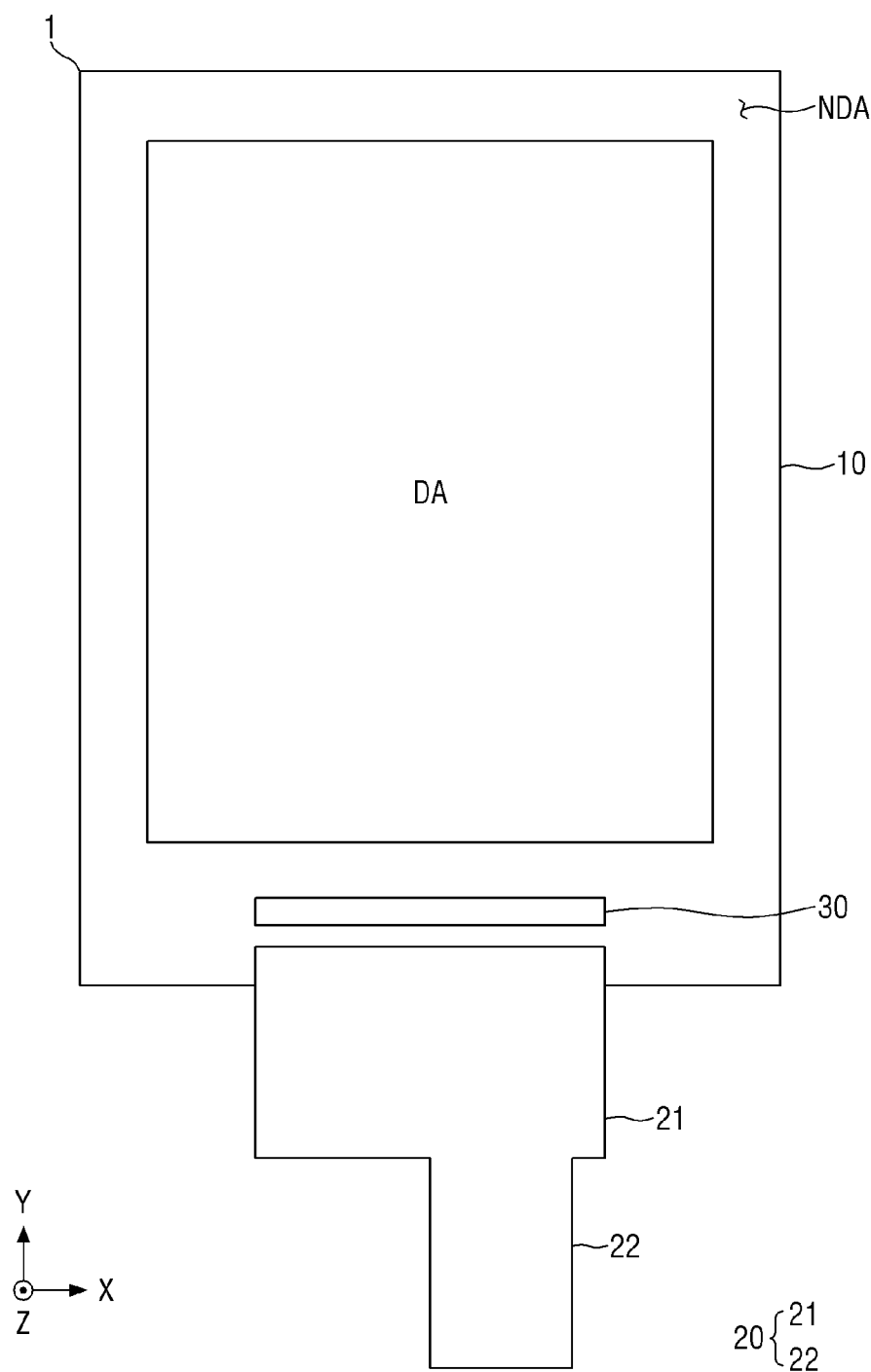
FIG. 1 is a schematic plan view of a display device according to an embodiment.

FIG. 1 is a schematic plan view of a display device according to an embodiment.

In this disclosure, a first direction (X), a second direction (Y), and a third direction (Z) are indicated.

The first direction X may be a direction parallel to a first side of the display device 1 in a plan view, for example, a horizontal direction of the display device 1. The second direction Y may be a direction parallel to a side of the display device 1 that meets the first side of the display device 1 in a plan view, and may be a vertical direction of the display device 1. The third direction Z may be the thickness direction of the display device 1. In the following description, the first direction X indicates the right direction in a plan view, a direction opposite to the first direction X indicates the left direction in a plan view, the second direction Y indicates the upper direction in a plan view, and a direction opposite to the second direction Y indicates the lower direction in a plan view. The third direction Z indicates an upward direction in cross-sectional view, and a direction opposite to the third direction Z indicates a downward direction in cross-sectional view. However, it is to be understood that the described directions are intended to mean relative directions, and the disclosure is not limited to the directions described in the embodiments.

The display device 1 may include various electronic devices that provide a display screen. Examples of the display device 1 may include, but are not limited to, a mobile phone, a smartphone, a tablet personal computer (PC), a mobile communication terminal, an electronic notebook, a personal digital assistant (PDA), a portable multimedia player (PMP), a navigation device, an ultra mobile PC (UMPC), a television, a game machine, a wrist watch-type electronic device, a head-mounted display, a personal computer monitor, a notebook computer, a vehicle instrument panel, a digital camera, a camcorder, an external billboard, an electronic billboard, various medical devices, various inspection devices, various household appliances which display an image or a video at a display area DA such as a refrigerator or a washing machine, an Internet-of-Things (IoT) device, and the like.

Referring to FIG. 1, a front surface and/or a rear surface of the display device 1 may be a display surface. Here, a "front surface" may be a surface located on a side of a plane and refer to a surface located in the third direction Z in a drawing, and a "rear surface" may be a surface located on the opposite side of the plane and refer to a surface located in a direction opposite to the third direction Z in the drawing.

In an embodiment, the display surface may be located on the front surface of the display device 1, and no image may be seen from or display at the rear surface. In the following description, the above-mentioned embodiment will be described. However, the display device 1 may be a double-sided display device in which images can be seen from and displayed at both the front surface and the rear surface.

The display device 1 may include a display panel 10 including a display screen, a display driving circuit (or a display driver chip) 30, a scan driver 50, and a circuit board 20. The display driving circuit 30, the scan driver 50, and the circuit board 20 may be disposed in a non-display area NDA of the display panel 10.

Examples of the display panel 10 may include a light-receiving display panel 10 such as a liquid crystal display (LCD) panel and an electrophoretic display (EPD) panel, as well as a self-luminous display panel 10 such as an organic light emitting diode (OLED) panel, an inorganic electroluminescent (EL) display panel, a quantum dot light emitting display (QLED) panel, a micro-LED display panel, a nano-LED display panel, a plasma display panel (PDP), a field emission display (FED) panel, a cathode ray tube (CRT) display panel, and the like. Hereinafter, an organic light emitting display panel will be described as an example of the display panel 10. Unless special distinction is necessary, the organic light emitting display panel applied to an embodiment will be simply referred to as the display panel 10. However, an embodiment is not limited to the organic light emitting display panel, and other display panels enumerated above or otherwise are within the scope of the disclosure.

The display panel 10 may have a rectangular shape having short sides in the first direction X and long sides in the second direction Y in a plan view. The corner where the short side in the first direction X meets the long side in the second direction Y may be formed to have a round shape of a curvature or a right angle shape.

The planar shape of the display panel 10 is not limited to a rectangular shape, and may be formed in another polygonal shape, circular shape, or elliptical shape. Further, the display panel 10 may be formed to be flexible such that it can be intentionally bent, warped, folded, and/or rolled.

The display panel 10 may include a display layer which displays a screen.

Figure 2:
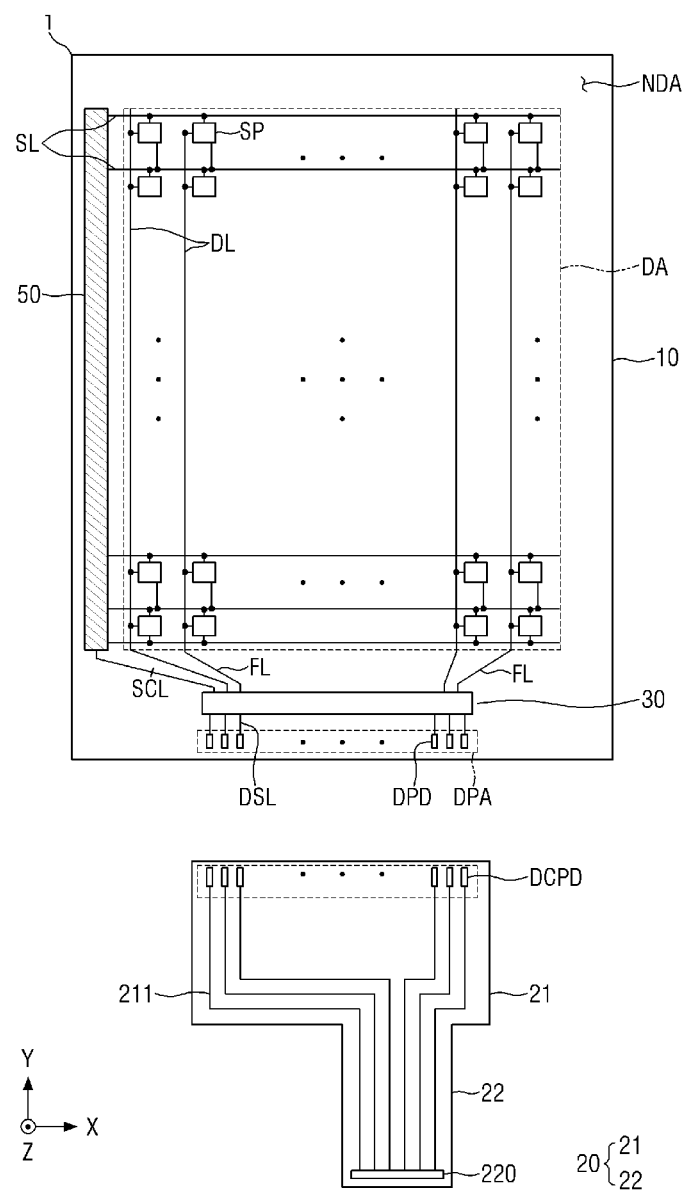
FIG. 2 is a schematic plan view showing an arrangement structure of multiple data signal lines and multiple conductive lines of a circuit board according to an embodiment.

The display layer may include pixels SP(FIG. 2). A pixel SP may be a basic unit to display an image. A pixel SP may include, but is not limited to, a red pixel SP, a green pixel SP, and a blue pixel SP. The pixels SP may be alternately arranged when viewed from above. For example, the pixels SP may be arranged in a matrix form, but the disclosure is not limited thereto.

The display panel 10 may include a display area DA and the non-display area NDA. A portion in which a screen may be displayed may be defined as a display area DA, and a portion in which no screen may be displayed may be defined as a non-display area NDA.

The shape of the illustrated display area DA is a rectangle that is longer in the second direction Y than in the first direction X. However, the disclosure is not limited thereto, and the display area DA may be shaped like a rectangle that has rounded corners and may be longer in the first direction X than in the second direction Y, or may have various shapes, such as another polygonal shape, a circular shapes, or an elliptical shape.

The non-display area NDA may be disposed around the display area DA. The non-display area NDA may be a bezel region. The non-display area NDA may surround all sides of the display area DA. However, the disclosure is not limited thereto. For example, the non-display area NDA may be disposed around three sides of the display area DA. The remaining side of the display area DA, other than the three sides, may form an edge of the display device 1.

In the non-display area NDA, signal lines for applying a signal to the display area DA or driving circuits may be arranged. The non-display area NDA may not include the display area.

The display driving circuit 30 may be disposed in the non-display area at a lower side of the display panel 10. The display driving circuit 30 may be formed as an integrated circuit (IC), and may be attached to the non-display area NDA at the lower side of the display panel 10 by a chip on glass (COG) method, a chip on plastic (COP) method, or an ultrasonic bonding method. For example, the display driving circuit 30 may be attached onto the circuit board 20.

Although not specifically illustrated in the drawing, the display driving circuit 30 may receive a clock voltage, a data voltage, and the like from a main processor of a main circuit board through conductive lines (e.g., 211 in FIG. 2) of the circuit board 20 and generate signals for driving the pixels SP of the display panel 10.

The circuit board 20 may be disposed in the non-display area NDA at the lower side of the display panel 10. The circuit board 20 may be attached onto a pad part (DPA in FIG. 2) disposed in the non-display area NDA at the lower side of the display panel 10 through a connection member which is described below. The circuit board 20 may include conductive lines 211 for transmitting a signal from the main circuit board to the display driving circuit 30. In the following description, while the circuit board 20 has been illustrated as a flexible circuit board including a flexible material, the disclosure is not limited thereto, and the circuit board 20 may be a rigid circuit board.

FIG. 2 is a schematic plan view showing an arrangement structure of multiple data signal lines and multiple conductive lines of a circuit board according to an embodiment.

For convenience of illustration, FIG. 2 schematically illustrates pixels SP, scan lines SL, data signal lines DL, and the like of the display layer. FIG. 2 illustrates conductive lines 211 electrically connected to the display driving circuit 30 through a display pad part DPA among conductive lines 211 of the circuit board 20.

The display panel 10 may include the display layer as described above.

Referring to FIG. 2, the display layer may include pixels SP, and scan lines SL and data signal lines DL which may be respectively connected to each of the pixels SP.

Each of the pixels SP may include a light emitting element EL for displaying a screen and thin film transistors that drive the light emitting element EL. The thin film transistors may include a driving transistor that controls a current flowing through the light emitting element EL and a switch transistor serving as a switching element. Each of the pixels SP may be connected to at least one of the scan lines SL and one of the data signal lines DL.

The scan lines SL may extend in the first direction X from the scan driver 50 disposed in the non-display area NDA at a side of the display panel 10. The scan driver 50 may be applied a scan control signal from the display driving circuit 30 through the scan control line SCL, generate a scan signal in response to the scan control signal, and apply the scan signal to the scan lines SL. The scan lines SL may transmit the scan signal applied from the scan driver 50 to the pixels SP, respectively. The scan driver 50 may control turn-on or turn-off of the switch transistor through the scan lines SL.

The data signal lines DL may extend in the second direction Y. The data signal lines DL may be connected to the display driving circuit 30 through a fan-out line FL. The data signal lines DL may be respectively applied data signals generated by the display driving circuit 30. The display driving circuit 30 may control a light emission amount of the light emitting element EL through the data signal lines DL. In other words, the data signals of the data signal lines DL may be applied to a gate electrode of the driving transistor to control a current value flowing through the light emitting element EL.

Referring to FIG. 2, a pad part DPA may be disposed in the non-display area NDA at the lower side of the display panel 10. The pad part DPA may be electrically connected to the circuit board 20 through a connection member.

The pad part DPA may include display pads DPD connected to the display driving circuit 30 through display signal lines DSL. The display signal lines DSL may include data voltage lines for the display driving circuit 30 to generate data signals, a ground connection line, a clock voltage line for generating a scan control signal, and the like.

The circuit board 20 may include a body part 21 and a tail part 22.

The tail part 22 of the circuit board 20 may be connected to the main circuit board. However, the disclosure is not limited thereto. For example, the circuit board 20 may include the body part 21 and may be connected to the main circuit board through a separate cable.

The body part 21 may have a rectangular shape that may be wider in the first direction X than in the second direction Y when viewed from above. The width in the first direction X of the body part 21 may be smaller than the width in the first direction X of the display panel 10. The tail part 22 may have a shape protruding from a lower end of the body part 21. The tail part 22 may have a rectangular shape that may be wider in the second direction Y than in the first direction X. The width in the first direction X of the tail part 22 may be smaller than the width in the first direction X of the body part 21. However, embodiments are not limited thereto. The shape of the circuit board 20 may be widely varied. For example, a side of each of the body part 21 and the tail part 22 of the circuit board 20 may be inwardly recessed or protrudes or at least a portion of the circuit board 20 may include a hole.

The circuit board 20 may include connection pads DCPD and conductive lines 211 to be electrically connected to the display pads DPD of the display panel 10, respectively. The connection pads DCPD may be connected to the pads DPD of the display panel 10.

The circuit board 20 may include a coupling member 220 disposed at a lower end of the tail part 22. The coupling member may be, but is not limited to, a connector for connection with the main circuit board.

As shown in FIG. 2, some conductive lines 211 may extend in a direction opposite to the second direction Y and may be bent and extend in the first direction X in the body part 21, and may be bent again and extend back in the direction opposite to the second direction Y and be disposed in the tail part 22. Accordingly, the first conductive lines 211 may be electrically connected to the main circuit board through the coupling member.

However, the extending direction of the conductive lines 211 shown in FIG. 2 is schematically illustrated for convenience of description, and the embodiments are limited thereto. The extending direction of the conductive lines 211 may vary.

Figure 3:
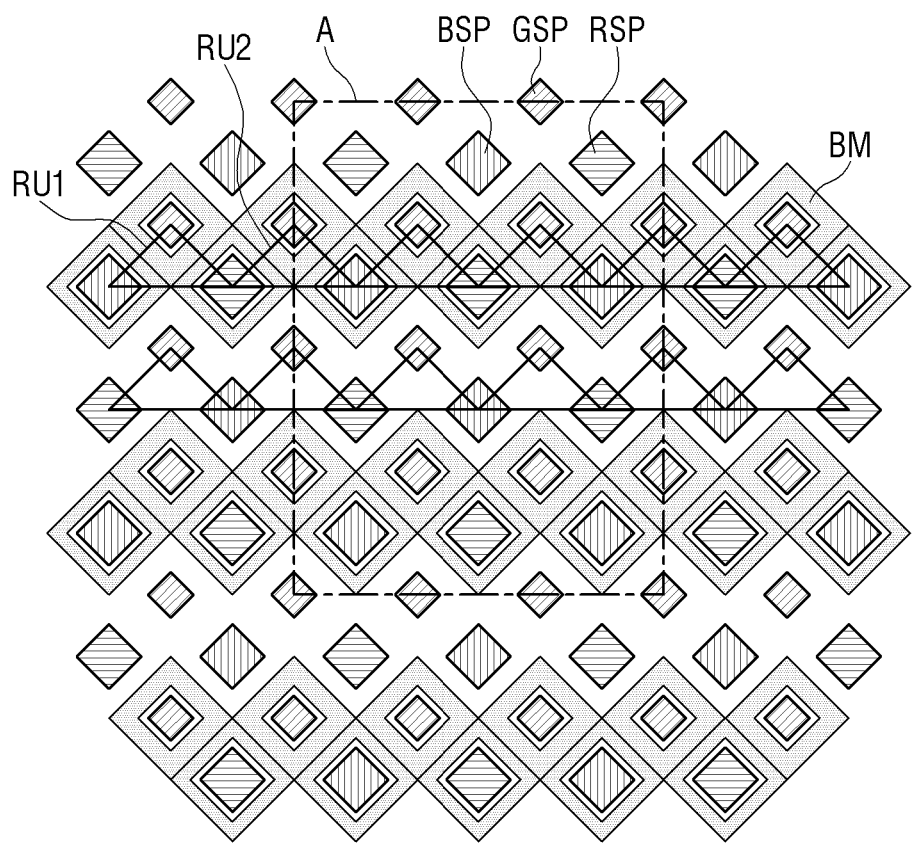
FIG. 3 is a schematic plan view showing arrangement of pixels and light blocking layers of a display device according to an embodiment.
Figure 3:
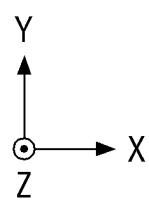

FIG. 3 is a schematic plan view showing arrangement of pixels and light blocking layers of a display device according to an embodiment.

Referring to FIG. 3, a display device 1 according to an embodiment uses red, green, and blue as unit colors, and multiple sub-pixels SP disposed on the display panel 10 may be disposed as shown in FIG. 3.

Specifically, red sub-pixels RSP and blue sub-pixels BSP may be arranged in the same row and column of the display panel 10 and may be alternately arranged in any one row and any one column. Green sub-pixels GSP may be arranged in a different row and column from the red sub-pixels RSP and the blue sub-pixels BSP. For example, the sub-pixels SP may have a PenTile® arrangement. However, such an arrangement of sub-pixels SP is only illustrative, and the disclosure is not limited thereto.

The blue sub-pixel BSP, the green sub-pixel GSP, and the red sub-pixel RSP arranged adjacent to one another may form a rendering unit. The three sub-pixels SP included in a rendering unit may be embodied together in the process of producing a color. For example, a blue sub-pixel BSP, a green sub-pixel GSP, and a red sub-pixel RSP included in a first rendering unit RU1 may be operated together. In case that the first rendering unit RU1 emits white light, the blue sub-pixel BSP, the green sub-pixel GSP, and the red sub-pixel RSP included in the first rendering unit RU1 may respectively emit blue light, green light, and red light at the same intensity. Accordingly, the combination of the light from the three sub-pixels SP may be perceived as white light by a user when viewed from the outside of the display device 1.

The display panel 10 may include multiple rendering units. Rendering units arranged adjacent to each other in the first direction X may share a sub-pixel SP with each other. For example, in the drawing, the red sub-pixel RSP included in the first rendering unit RU1 may also be included in a second rendering unit RU2. A blue sub-pixel BSP included in the second rendering unit RU2 may also be included in a third rendering unit. A group of rendering units arranged adjacent to each other and continuously sharing a sub-pixel SP with each other, such as the first rendering unit RU1, the second rendering unit RU2, and the third rendering unit, and the like, may be defined as a rendering group.

A light blocking layer BM may be disposed for each rendering group. Specifically, in a plan view, the light blocking layer BM may be disposed around the sub-pixels SP included in a rendering group, may not be disposed around the sub-pixels SP included in a rendering group adjacent to that rendering group in the second direction Y, and may be disposed around the sub-pixels SP included in another rendering group adjacent to that rendering group in the second direction Y. In other words, the rendering group BM with the light blocking layer BM disposed therearound and the rendering group without the light blocking layer BM disposed therearound may be alternately arranged in the second direction Y.

Figure 4:
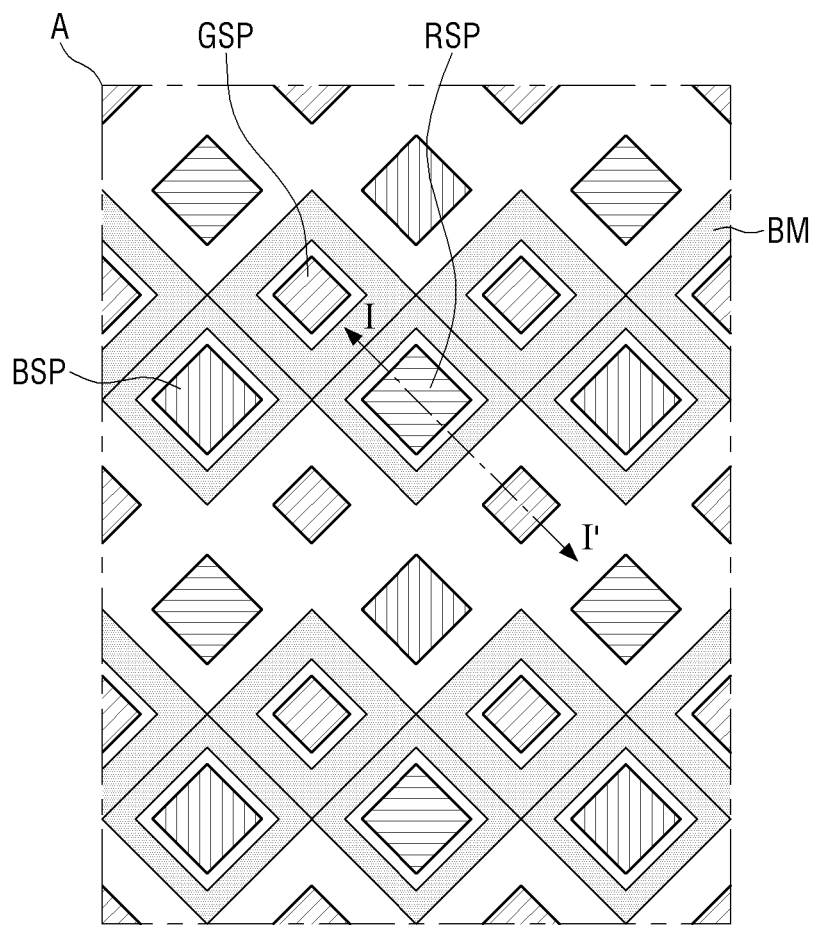
FIG. 4 is an enlarged schematic view of portion A of FIG. 3.

FIG. 4 is an enlarged schematic view of portion A of FIG. 3.

Referring to FIG. 4, the display panel 10 may include first pixel groups and second pixel groups. The first pixel group may be a set of pixels SP in which the light blocking layer BM may be disposed around the pixels in a plan view, and the second pixel group may be a set of pixels SP in which the light blocking layer BM may not be disposed around the pixels in a plan view. For example, the first pixel groups may exhibit low luminance since emitted light may be blocked by the light blocking layer BM at high viewing angle, and the second pixel groups may exhibit sufficient luminance since emitted light may not be blocked even at high viewing angle.

The first pixel groups and the second pixel groups may each have a structure extending in the first direction X. The first pixel groups and the second pixel groups may be alternately arranged periodically in the second direction Y.

The first pixel group and the second pixel group may each include multiple green sub-pixels GSP, red sub-pixels RSP, and blue sub-pixels BSP. The sub-pixels SP may have different sizes from one another. For example, the green sub-pixels GSP may be smaller than the red sub-pixels RSP or the blue sub-pixels BSP, and the red sub-pixels RSP and the blue sub-pixels BSP may have substantially the same size, but the disclosure is not limited thereto.

Each of the green sub-pixels GSP, the red sub-pixels RSP, and the blue sub-pixels BSP may each have a rectangular planar shape such as a rhombus, but is not limited thereto, and may have an octagonal or another polygonal planar shape.

The display device 1 according to an embodiment may operate in a first mode and in a second mode. The first mode may be a mode in which all the first and second pixel groups emit light. The first mode may be a normal mode. The second mode may be a mode in which the first pixel groups emit light but the second pixel groups do not emit light. The second mode may be a private mode.

As will be described below with reference to FIG. 6, in a large viewing angle environment, light emitted from the first pixel group may be blocked by the light blocking layer BM so that the ratio of light visually recognized from the outside of the display device 1 may be small. Therefore, in case that the display device 1 is driven in the first mode, in a large viewing angle environment, the light emitted from the first pixel group may be blocked, but the light emitted from the second pixel group may not be blocked, so that a relatively high luminance ratio can be exhibited. On the other hand, in case that the display device 1 is driven in the second mode, in a large viewing angle environment, the light emitted from the first pixel group may be blocked and the second pixel group does not emit light, so that a relatively low luminance ratio can be exhibited. In other words, in case that the display device 1 is driven in the second mode, a luminance ratio that significantly differs according to the viewing angle can be achieved. Accordingly, sufficient luminance may be provided to a user who gazes at the display device 1 at a small viewing angle, and at the same time, the luminance ratio may be reduced at a large viewing angle so that the risk of exposing the personal information of the user of the display device 1 may be prevented.

As described above with reference to FIG. 4, the first pixel group and the second pixel group may be disposed for each rendering group. For example, the sub-pixels SP included in the first pixel group may each produce a color along with two adjacent sub-pixels SP. The three sub-pixels SP that produce a color may be sub-pixels SP that emit different colors of light. Thus, all the light emitted from the first pixel group may or may not be blocked by the light emitting layer BM according to the viewing angle. For example, all three sub-pixels SP included in the first pixel group and producing a color may or may not be blocked. Accordingly, in case that the display device 1 is driven in the first mode, a color shift that occurs in case that some of the three sub-pixels SP that produce a color are blocked by the light blocking layer BM and other pixels may not be blocked in a large viewing angle environment may be prevented. In other words, the light blocking layer BM or no light blocking layer BM may be disposed around all of the three sub-pixel SP that produce a color so that a problem of a different color appearing depending on a viewing angle can be prevented.

Figure 5:
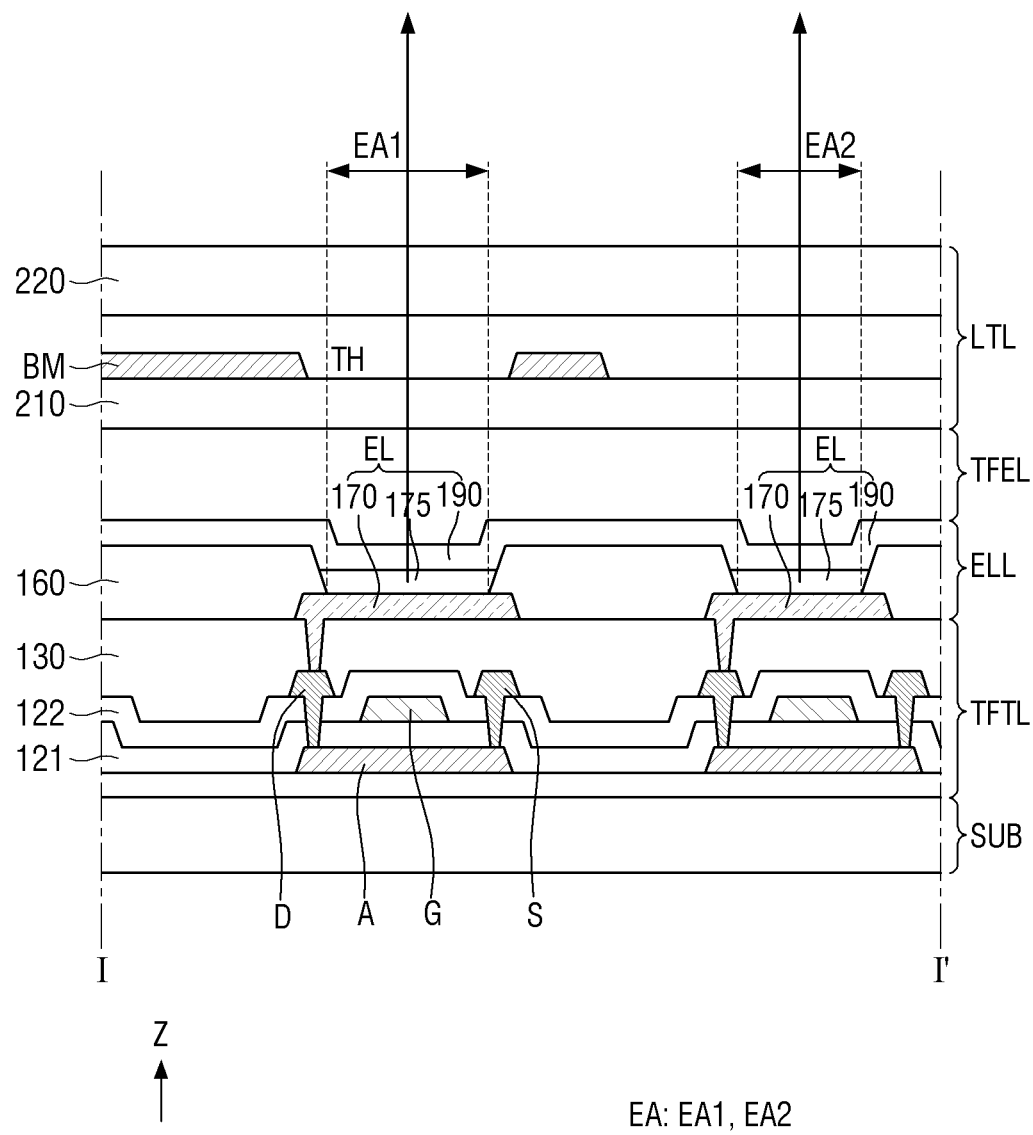
FIG. 5 is a schematic cross-sectional view taken along line I-I' of FIG. 4.

FIG. 5 is a schematic cross-sectional view taken along line I-I' of FIG. 4.

Referring to FIG. 5, the display device 1 may include a substrate SUB, and a thin film transistor (TFT) layer TFTL, a light emitting element layer ELL, an encapsulation layer TFEL, a light transmitting layer LTL, and a window may be sequentially disposed on the substrate SUB.

The substrate SUB may be a rigid substrate, or a flexible substrate that may be bendable, foldable, and/or rollable. The substrate SUB may be made of an insulating material, such as glass, quartz, or polymer resin.

A buffer layer 110 may be disposed on a surface of the substrate SUB. The buffer layer 110 may include silicon nitride, silicon oxide, and/or silicon oxynitride.

The TFT layer TFTL may be disposed on the buffer layer. The TFT layer TFTL may include a semiconductor layer A, a gate insulating layer 121 disposed on a portion of the semiconductor layer A, a gate electrode G on the gate insulating layer 121, an interlayer insulating layer 122 covering the semiconductor layer A and the gate electrode G, and a source electrode S and a drain electrode D on the interlayer insulating layer 122.

The semiconductor layer A may form a channel. The semiconductor layer A may include polycrystalline silicon. In another embodiment, the semiconductor layer A may include single crystalline silicon, low temperature polycrystalline silicon, amorphous silicon, and/or an oxide semiconductor. The oxide semiconductor may include, for example, indium, zinc, gallium, tin, titanium, aluminum, hafnium (Hf), zirconium (Zr), two-component compound ($AB_x$) containing magnesium (Mg) or the like, ternary compound ($AB_xC_y$), four-component compound ($AB_xC_yD_z$), or a combination thereof. The semiconductor layer A may include a channel region and a source region and a drain region doped with impurities, respectively.

The gate insulating layer 121 may be disposed on the semiconductor layer A. The gate insulating layer 121 electrically insulates the gate electrode and the semiconductor layer A. The gate insulating layer 121 may be formed of an insulating material, for example, silicon oxide ($SiO_x$), silicon nitride ($SiN_x$), and/or metal oxide.

The gate electrode G may be disposed on the gate insulating layer 121. The gate electrode may be formed on an upper portion of the channel region of the semiconductor layer A, for example, on the gate insulating layer 121 at a position overlapping the channel region.

The interlayer insulating layer 122 may be disposed on the gate electrode G. The interlayer insulating layer 122 may include an inorganic insulating material, such as silicon oxide ($SiO_x$), silicon nitride ($SiN_x$), silicon oxynitride, hafnium oxide, and/or aluminum oxide.

A source electrode S and a drain electrode D may be disposed on the interlayer insulating layer 122. The source electrode S may be electrically connected to the drain electrode D of the semiconductor layer A through a contact hole penetrating the interlayer insulating layer 122 and the gate insulating layer 121. The source electrode S and the drain electrode D may include one or more metals selected from aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu).

A planarization layer may be formed on the interlayer insulating layer 122 to cover the source electrode S and the drain electrode D. The planarization layer 130 may be formed of an organic insulating material or the like. The planarization layer 130 may have a flat surface and may include a contact hole that exposes one of the source electrode S and the drain electrode D.

A light emitting element layer ELL may be disposed on the planarization layer 130. The light emitting element layer ELL may include a light emitting element EL and a pixel defining layer. The light emitting element EL may include a pixel electrode 170, an emission layer 175, and a common electrode 190.

The pixel electrode 170 of the light emitting element EL may be disposed on the planarization layer 130. The pixel electrode 170 may be disposed for each pixel PX. The pixel electrode 170 may be connected to the source electrode S or the drain electrode D of the thin film transistor through a contact hole penetrating the planarization layer 130.

The pixel electrode 170 of the light emitting element EL may have, but is not limited to, a single layer structure of molybdenum (Mo), titanium (Ti), copper (Cu), and/or aluminum (Al), and/or a laminated structure, for example, indium-tin-oxide (ITO), indium-zinc-oxide (IZO), zinc oxide (ZnO), indium oxide ($In_2O_3$), and a multi-layer structure of ITO/Mg, ITO/MgF, ITO/Ag, and/or ITO/Ag/ITO containing silver (Ag), magnesium (Mg), Aluminum (Al), platinum (Pt), lead (Pb), gold (Au), and/or nickel (Ni).

The pixel defining layer 160 may be disposed on the pixel electrode 170. The pixel defining layer 160 may have an opening in a region overlapping the pixel electrode 170 to expose the pixel electrode 170. A region where the exposed pixel electrode 170 overlaps the emission layer 175 may be defined as a first emission part EA1 or a second emission part EA2 of each pixel PX.

The pixel defining layer 160 may include an organic insulating material, such as polyacrylate resin, epoxy resin, phenolic resin, polyamide resin, polyimide resin, unsaturated polyester resin, polyphenylenether resin, polyphenylenesulfide resin, benzocyclobutene (BCB), and/or the like. In another example, the pixel defining layer 160 may include an inorganic material, such as silicon nitride.

The emission layer 175 may be disposed on the pixel electrode 170 of the light emitting element EL exposed by the opening of the pixel defining layer 160. The emission layer 175 may include a high molecular material or a low molecular material, and may emit red, green, or blue light for each pixel PX. The light emitted from the emission layer 175 may contribute to image display.

In case that the emission layer 175 is formed of an organic material, a hole injection layer (HIL) and a hole transporting layer (HTL) may be disposed at a lower portion of each emission layer 175, and an electron injecting layer (EIL) and an electron transporting layer (ETL) may be stacked on an upper portion of the emission layer 175. These layers may each be a single layer or multiple layers formed of an organic material.

The common electrode 190 may be disposed on the emission layer 175 and the pixel defining layer 160. The common electrode 190 may be disposed over the pixels PX in a form that covers the emission layer 175 and the pixel defining layer 160. The common electrode 190 may include a conductive material having low work function, for example, Li, Ca, LiF/Ca, LiF/Al, Al, Mg, Ag, Pt, Pd, Ni, Au Nd, Ir, Cr, BaF, Ba or a compound or mixture thereof (e.g., a mixture of Ag and Mg, etc.). In other embodiments, the common electrode 190 may include a transparent metal oxide, for example, indium-tin-oxide (ITO), indium-zinc-oxide (IZO), zinc oxide (ZnO), and the like, or a combination thereof.

The encapsulation layer TFEL may be disposed on an upper portion of the light emitting element layer ELL. The encapsulation layer TFEL may include at least one inorganic layer and one organic layer to protect the emission layer 175 from the permeation of oxygen or humidity or from foreign substances such as dust. For example, the encapsulation layer TFEL may be formed in a structure in which a first inorganic layer, an organic layer, and a second inorganic layer may be sequentially stacked. The first inorganic layer and the second inorganic layer may each be formed as a multi-layer in which one or more inorganic layers of a silicon nitride layer, a silicon oxynitride layer, a silicon oxide layer, a titanium oxide layer, and an aluminum oxide layer are alternately stacked. The organic layer may be an organic layer formed of an acrylic resin, an epoxy resin, a phenolic resin, a polyamide resin, a polyimide resin, or the like, or a combination thereof.

A transparent inorganic layer 210, a light blocking layer BM, and a transparent organic layer 220 of the light transmitting layer may be sequentially disposed on an upper portion of the encapsulation layer.

The transparent inorganic layer 210 may include an inorganic insulating material that transmits light. The transparent inorganic layer 210 may include a silicon nitride layer, silicon oxide layer, a titanium oxide layer, an aluminum oxide layer, or the like, or a combination thereof.

The light blocking layer BM disposed on the transparent inorganic layer 210 may include a material that blocks light emission from the light emitting element EL. The light blocking layer BM may include an organic light blocking material using a pigment (e.g., carbon black) or a resin material including a dye. Accordingly, the light blocking layer (BM) may block the light emitted from the light emitting part and prevent color mixing due to light intrusion between the adjacent light emitting parts EA.

The light blocking layer BM may include transmission holes TH overlapping the first light emitting parts EA1. The transmission hole TH may overlap the first light emitting part EA1 in the third direction Z. The width of the transmission hole TH may be larger than the width of the first light emitting part EA1, but is not limited thereto. For example, the width of the transmission hole TH may be 1 to 4 μm larger than the width of the first light emitting part EA1. The width of the transmission hole TH may be equal to the width of the first light emitting part EA1. The through hole TH may not overlap the pixel defining layer 160 in the third direction Z. An end of the light blocking layer BM may overlap an end of the pixel defining layer 160 in the third direction Z.

The transparent organic layer 220 disposed on the light blocking layer BM may include an organic material. The transparent organic layer 220 may be an organic layer formed of an acrylic resin, an epoxy resin, a phenolic resin, a polyamide resin, a polyimide resin, or the like, or a combination thereof.

The light blocking layer BM defining the transmission hole TH may be disposed to surround the first light emitting part EA1. Accordingly, the end of the pixel defining layer defining the light emitting part may overlap the end of the light blocking layer BM in the third direction Z.

In a case of a viewing angle of 0 degrees to 30 degrees, since the transmission hole TH overlaps the first light emitting part EA1 in the third direction Z, light emitted from a first emission layer 175 may be transmitted to the outside of the display device 1 and hence may be visible from the outside. Also, since the light blocking layer BM may not be disposed around a second emission layer 175, light emitted from the second emission layer 175 may be also emitted to the outside of the display device 1 and hence may be visible from the outside.

Figure 6:
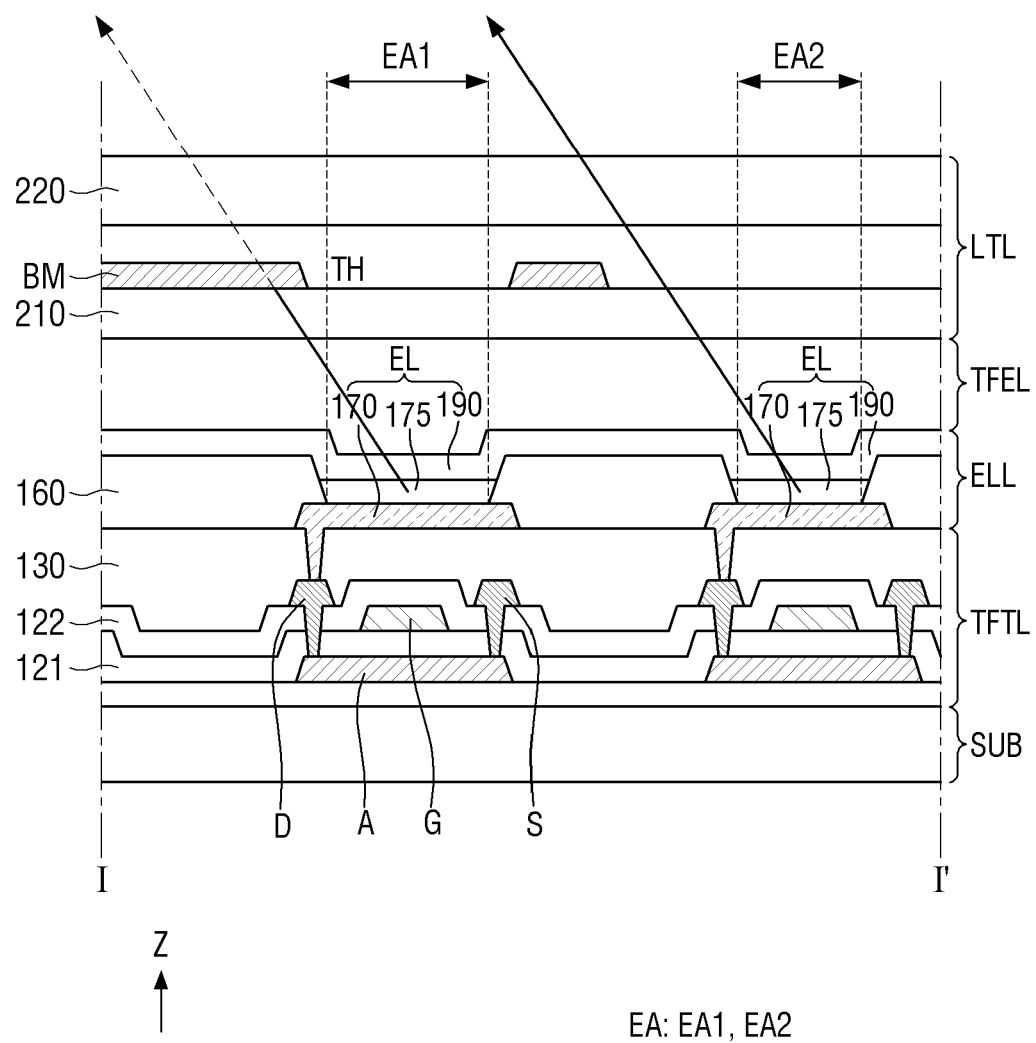
FIG. 6 is a schematic cross-sectional view showing the propagation path of light of FIG. 5 in a large viewing angle environment.

FIG. 6 is a schematic cross-sectional view showing the propagation path of light of FIG. 5 in a large viewing angle environment.

Referring to FIG. 6, in case that a viewing angle is large, the light emitted from the first light emitting part EA1 may not be visible from the outside or has low luminance, while the light emitted from the second light emitting part EA2 may be visible from the outside. More specifically, the light blocking layer BM may be disposed around the first light emitting part EA1. In a large viewing angle environment, the user of the display device 1 may view the display device 1 from a direction distant from the side surface rather than at a position overlapping the light emitting part in the third direction Z. The light blocking layer BM may be disposed between the user's eyes and the first light emitting part EA1, and accordingly, the light emitted from the first light emitting part EA1 may be blocked by the light blocking layer BM and hence may not be visible to the user, or only a small amount of reflected and/or diffracted light may be visible to the user. On the other hand, the light blocking layer BM may not be disposed around the second light emitting part EA2. Therefore, even in a large viewing angle environment, the light blocking layer BM may not be disposed between the user's eyes and the second light emitting part EA2, and accordingly, the light emitted from the second light emitting part EA2 may not be blocked, and thus is visible to the user.

The first light emitting part EA1 may be included in the first pixel group and the second light emitting part EA2 may be included in the second pixel group. For example, in a large viewing angle environment, light emitted by the first pixel groups may be blocked by the light blocking layer BM to have low luminance and light emitted by the second pixel groups may not be blocked by the light blocking layer BM and thus may have sufficient luminance.

Figure 7:
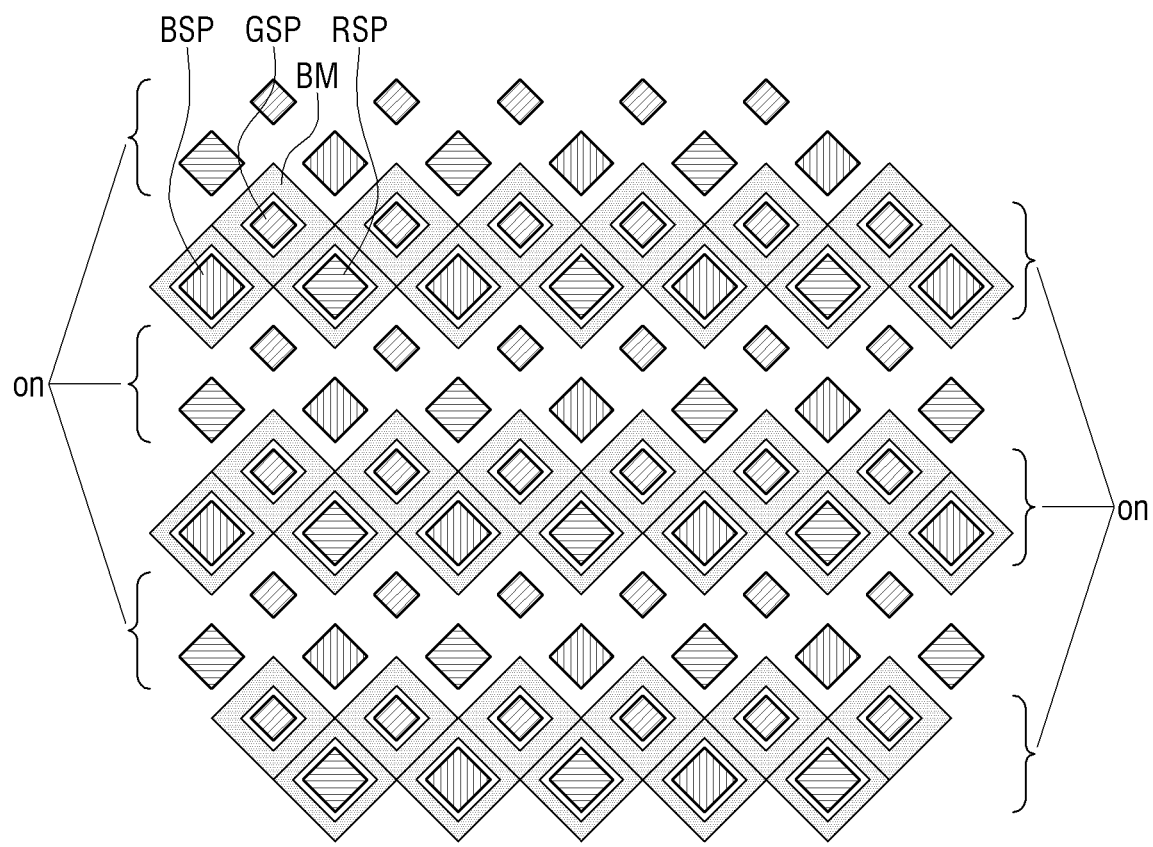
FIG. 7 is a schematic view showing a first pixel group and a second pixel group in case that a display device according to an embodiment operates in a first mode.

FIG. 7 is a schematic view showing a first pixel group and a second pixel group in case that a display device according to an embodiment is operating in a first mode.

Referring to FIG. 7, in case that the display device 1 is driven in the first mode, all sub-pixels SP included in the display device 1 may be in an on state. For example, the sub-pixels SP included in the first pixel group and the sub-pixels SP included in the second pixel group may all be in the on state. Such a first mode may be a normal mode.

It may be assumed that the display device 1 emits white light over the entire display area DA. All sub-pixels SP may emit light of the same intensity. Light emitted from the red sub-pixel RSP, the green sub-pixel GSP, and the blue sub-pixel BSP included in a rendering unit may be recognized as a light ray and recognized as white light.

In a small viewing angle environment, light emitted by the sub-pixels SP included in the first pixel group and light emitted by the sub-pixels SP included in the second pixel group may not be blocked by the light blocking layer BM and may be visible. Accordingly, the user may recognize that white light is emitted from the entire display area DA of the display device 1.

In a large viewing angle environment, all the light emitted by the sub-pixels SP included in the second pixel group may still be visible. The light emitted by the sub-pixels SP included in the first pixel group may be blocked by the light blocking layer BM so that only a part of the light may be visible from the outside. During this process, the light emitted by the red sub-pixels RSP, the blue sub-pixels BSP, and the green sub-pixels GSP forming the same rendering group may also be blocked. Accordingly, of the light recognized form the outside, the ratio of red, blue, and green included in the light emitted by the first pixel group may be the same as the ratio of red, blue, and green included in the light emitted by the second pixel group. For example, with the above-described structure, light emitted by some of the red sub-pixel RSP, the blue sub-pixel BSP, and the green sub-pixel GSP forming the same rendering unit may be blocked and the light emitted by other sub-pixels may not be blocked, so that it may be possible to prevent an unintended specific color from appearing in a corresponding region.

Figure 8:
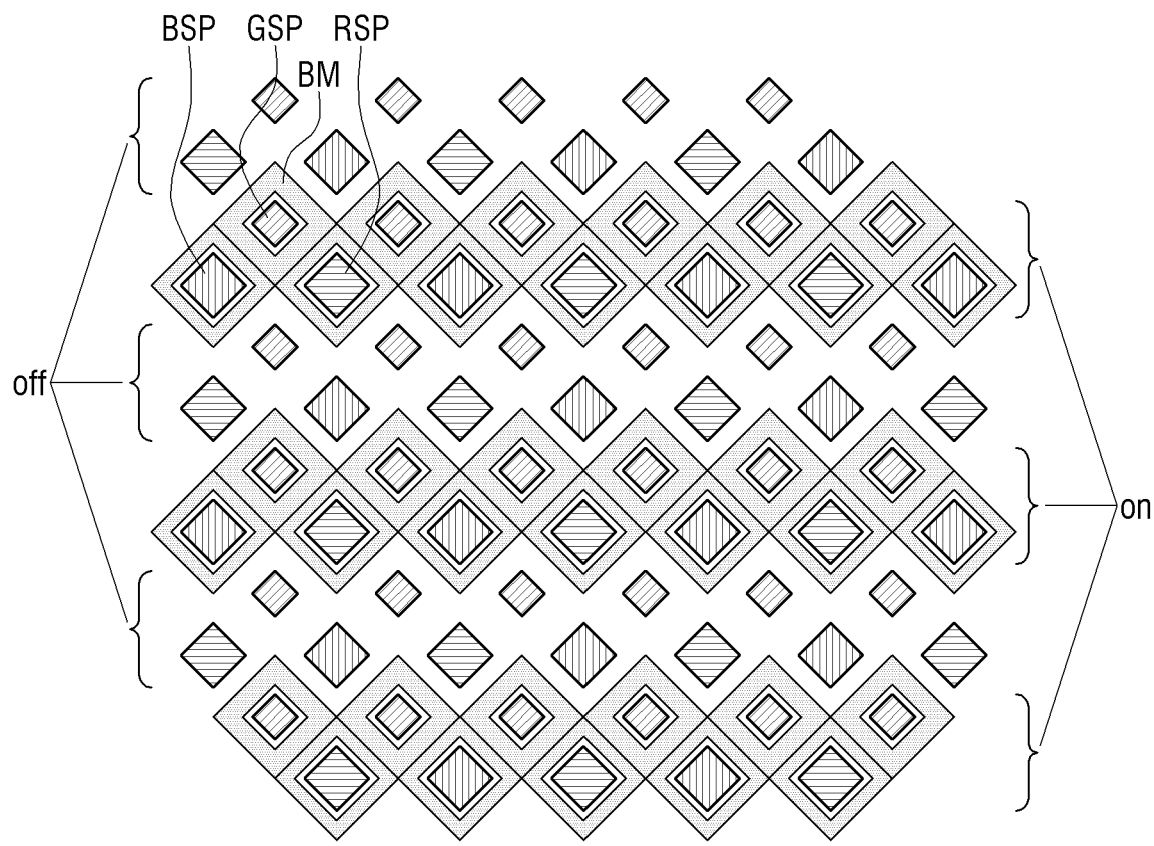
FIG. 8 is a schematic view showing the first pixel group and the second pixel group in case that the display device according to an embodiment operates in a second mode.

FIG. 8 is a schematic view showing the first pixel group and the second pixel group in case that the display device according to an embodiment is operating in a second mode.

Referring to FIG. 8, in case that the display device 1 is driven in the second mode, the sub-pixels SP included in the first pixel group may be in on state and the sub-pixels included in the second pixel group may be in off state. Such a second mode may be a private mode.

It may be assumed that the display device 1 emits white light. The sub-pixels SP included in the first pixel group may emit light of the same intensity, and the sub-pixels SP included in the second pixel group may not emit light. Light emitted by the red sub-pixel RSP, the green sub-pixel GSP, and the blue sub-pixel BSP included in one rendering unit among the sub-pixels SP included in the first pixel group may be recognized as a light ray and may be recognized as white light.

All the light emitted by the sub-pixels SP included in the first pixel group may not be blocked by the light blocking layer BM and may be visible. Accordingly, the user may recognize that white light may be emitted from the entire display area DA of the display device 1.

In a large viewing angle environment, the light emitted by the sub-pixels SP included in the first pixel group may be blocked by the light blocking layer BM so that only a part of the light may be visible from the outside. During this process, the light emitted by the red sub-pixels RSP, the blue sub-pixels BSP, and the green sub-pixels GSP forming the same rendering group may also be blocked.

Figure 9:
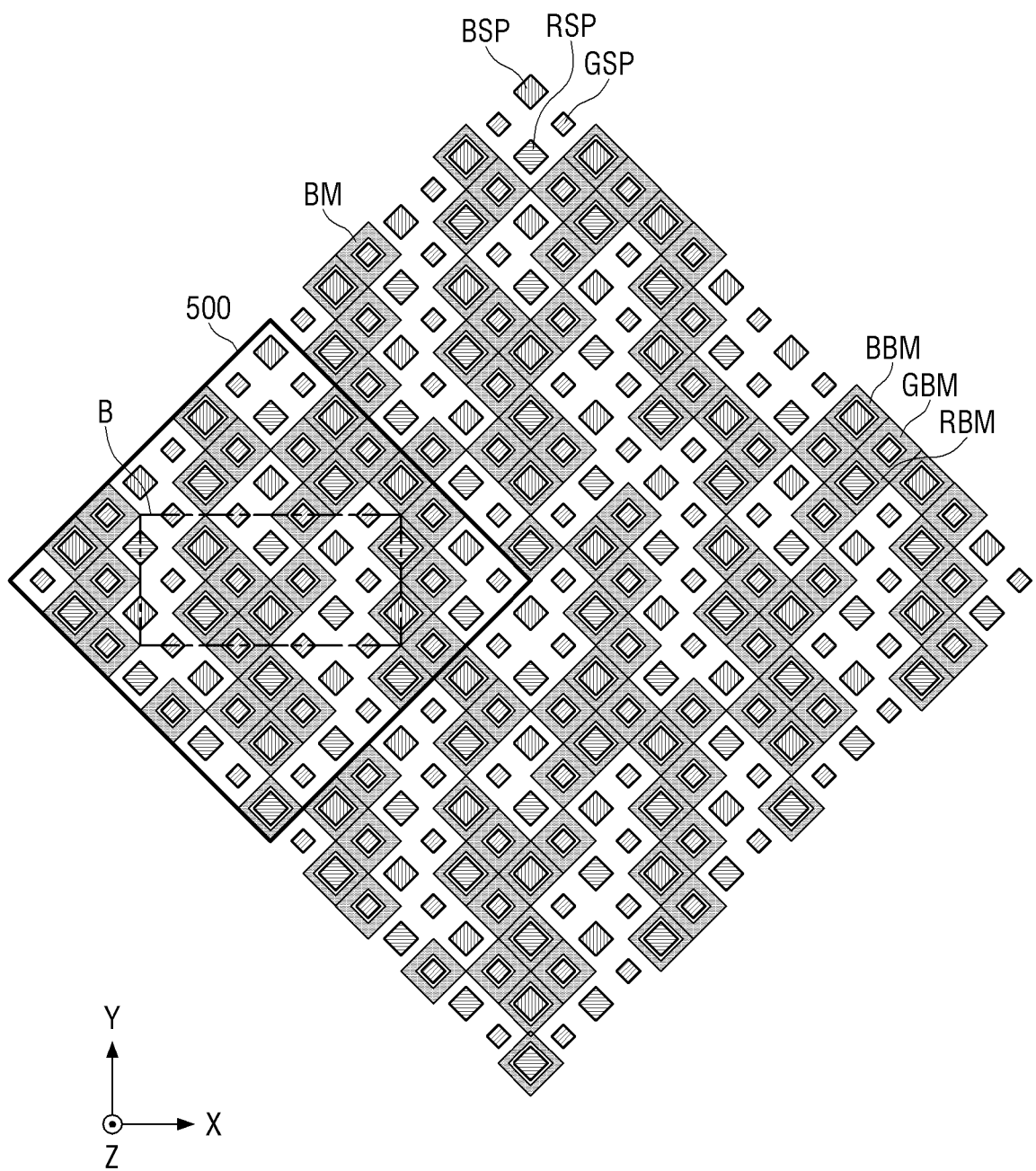
FIG. 9 is a schematic plan view showing the arrangement of pixels and light blocking layers of a display device according to another embodiment.
Figure 10:
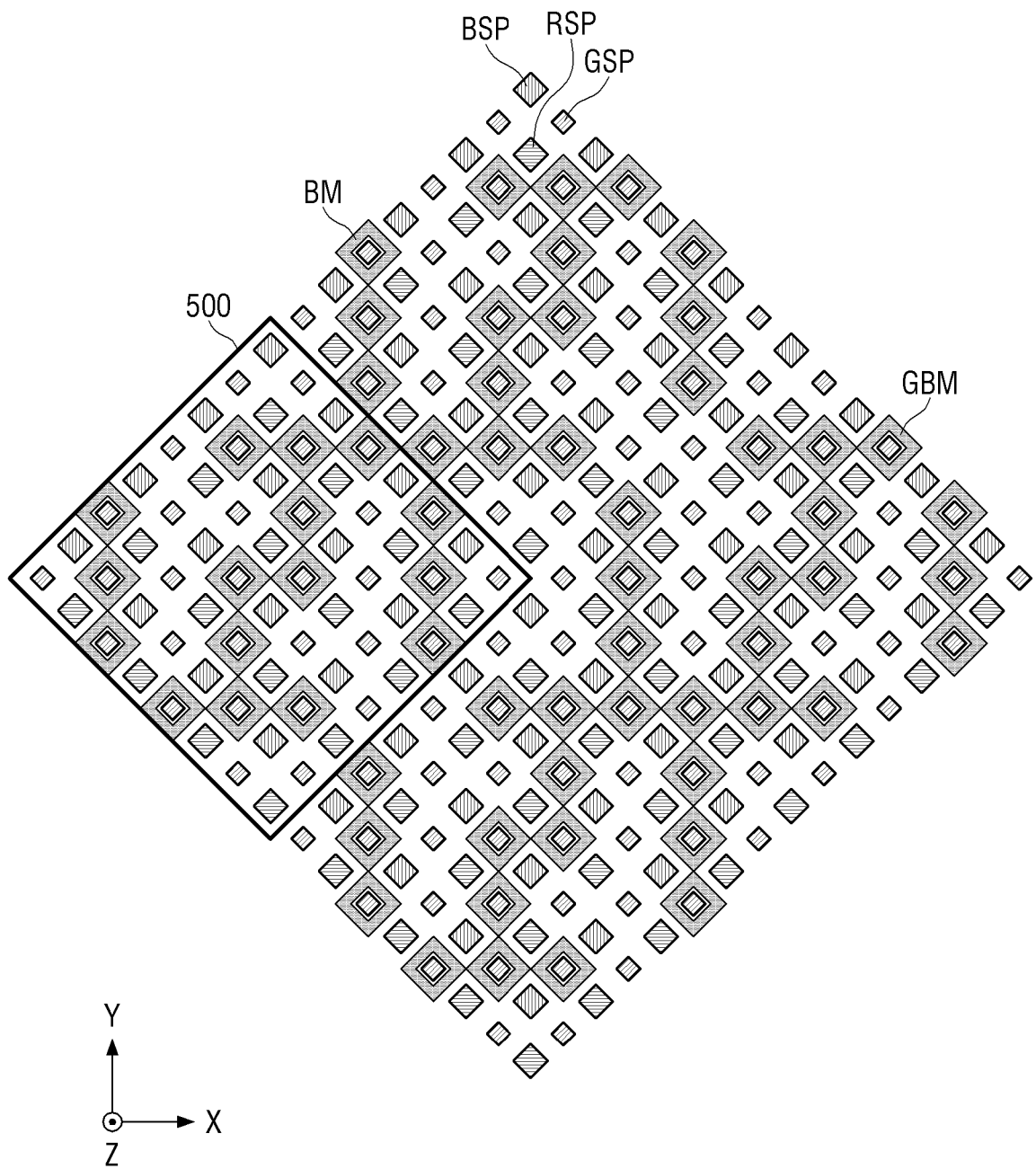
FIG. 10 is a schematic plan view showing only the light blocking layers disposed around green sub-pixels in FIG. 9.
Figure 11:
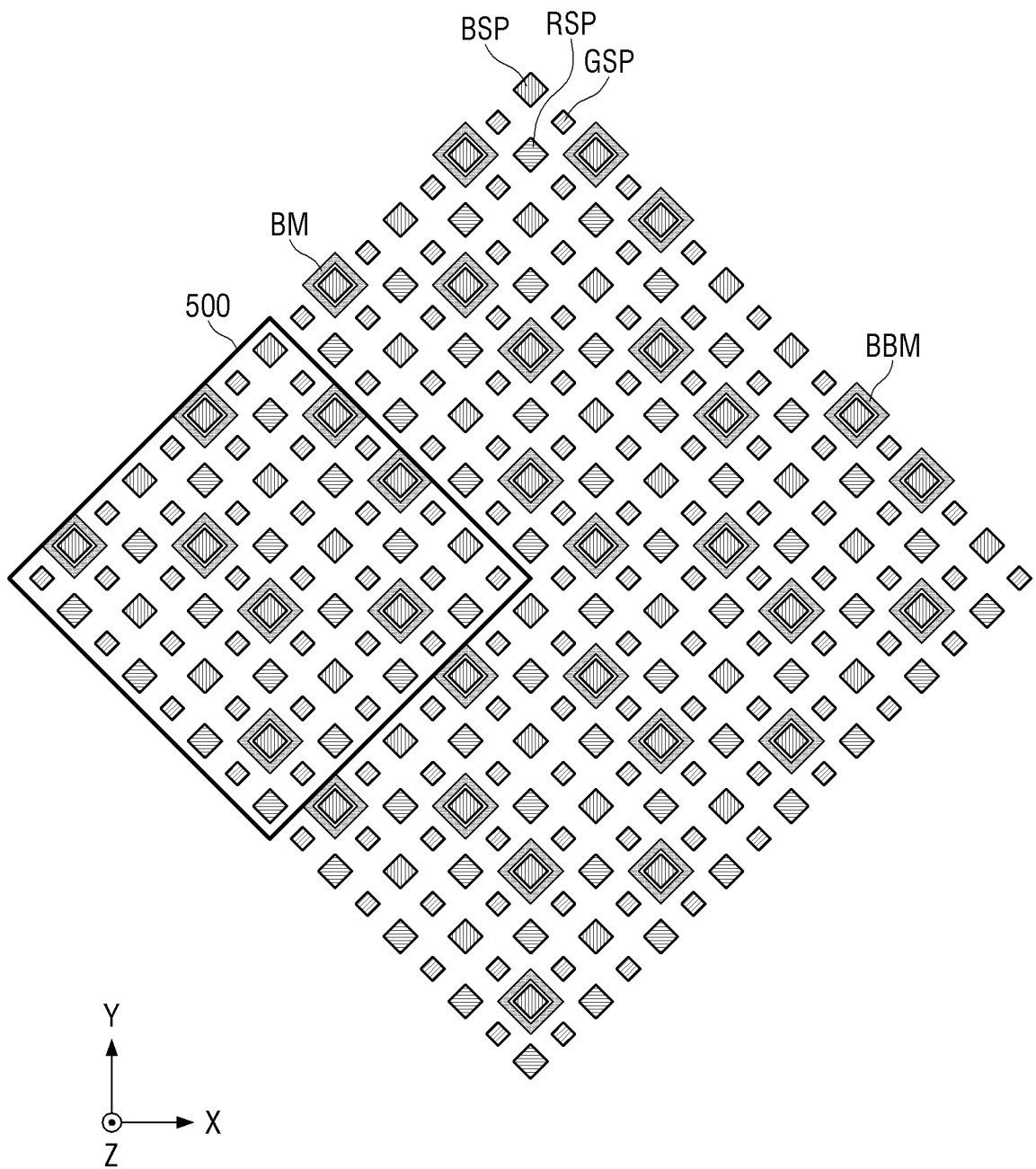
FIG. 11 is a schematic plan view showing only the light blocking layers disposed around blue sub-pixels in FIG. 9.
Figure 12:
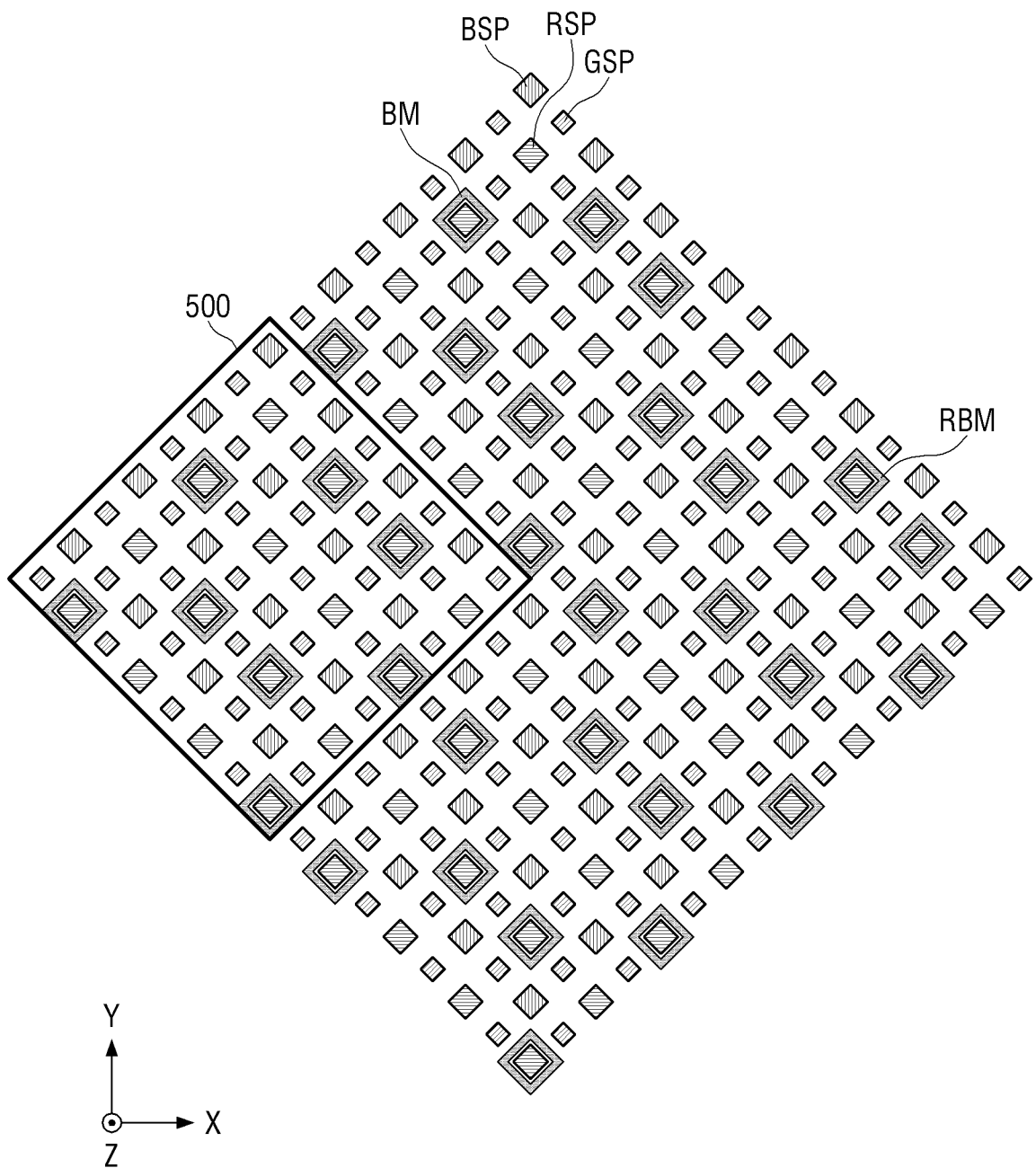
FIG. 12 is a schematic plan view showing only the light blocking layers disposed around red sub-pixels in FIG. 9.

FIG. 9 is a schematic plan view showing the arrangement of pixels and light blocking layers of a display device according to another embodiment. FIG. 10 is a schematic plan view showing only the light blocking layers disposed around green sub-pixels in FIG. 9. FIG. 11 is a schematic plan view showing only the light blocking layers disposed around blue sub-pixels in FIG. 9. FIG. 12 is a schematic plan view showing only the light blocking layers disposed around red sub-pixels in FIG. 9.

The display device 1 according to an embodiment may be different from an embodiment shown in FIG. 3 at least in the arrangement of the light blocking layer BM in a plan view. The same descriptions as those in an embodiment shown in FIG. 3 will be omitted and differences from an embodiment shown in FIG. 3 will be described.

Referring to FIG. 9, the light blocking layer BM may have a structure in which a light blocking pattern 500 may be repeatedly disposed. The light blocking layer BM may be disposed around only the half of the sixty-four sub-pixels SP included in a light blocking pattern 500 in the drawings, but the disclosure is not limited thereto. For example, according to the embodiment, some sub-pixels SP may include the light blocking layers BM in addition to the portion shown in the drawings.

A light blocking layer BM disposed around the green sub-pixel GSP may be defined as a green light blocking layer GBM, a light blocking layer BM disposed around the blue sub-pixel BSP may be defined as a blue light blocking layer BBM, and a light blocking layer disposed around a red sub-pixel RSP may be defined as a red light blocking layer RBM. Multiple green light blocking layers GBM, blue light blocking layers BBM, and red light blocking layers RBM disposed in the display panel 10 may be arranged as shown in FIG. 9. The light blocking layers BM may not be arranged to be connected in a line in any of the first direction X, the second direction Y, and a direction between the first direction X and the second direction Y. Therefore, in a large viewing angle environment, the arrangement of the light blocking layers BM as described above may suppress a color shift caused by disposing the light blocking layers BM around all the pixels PX disposed in a specific direction.

Referring to FIG. 10, the green light blocking layers GBM disposed in a light blocking pattern 500 may be disposed as shown in FIG. 10. In the light blocking pattern 500, the green light blocking layers GBM may not be continuously arranged around all green sub-pixels GSP in any of the first direction X, the second direction Y, and a direction between the first direction X and the second direction Y. In other words, at least one green sub-pixel GSP around which no light blocking layer BM may be arranged in the first direction X, the second direction Y, and the direction between the first direction X and the second direction Y may be disposed in the light blocking pattern 500.

Referring to FIG. 11, the blue light blocking layers BBM disposed in a light blocking pattern 500 may be disposed as shown in FIG. 10. In the light blocking pattern 500, the blue light blocking layers BBM may not be continuously arranged around all blue sub-pixels BSP in any of the first direction X, the second direction Y, and a direction between the first direction X and the second direction Y. In other words, at least one blue sub-pixel BSP around which no light blocking layer BM may be arranged in the first direction X, the second direction Y, and the direction between the first direction X and the second direction Y may be disposed in the light blocking pattern 500.

Referring to FIG. 12, the red light blocking layers RBM disposed in a light blocking pattern 500 may be disposed as shown in FIG. 10. In the light blocking pattern 500, the red light blocking layers RBM may not be continuously arranged around all red sub-pixels RSP in any of the first direction X, the second direction Y, and a direction between the first direction X and the second direction Y. In other words, at least one red sub-pixel RSP around which no light blocking layer BM may be arranged in the first direction X, the second direction Y, and the direction between the first direction X and the second direction Y may be disposed in the light blocking pattern 500.

In case that the green light blocking layers GBM, the blue light blocking layers BBM, and the red light blocking layers RBM are disposed as described above, in a large viewing angle environment, the light emitted by the sub-pixels SP around which the light blocking layer BM may be disposed may be blocked while the light emitted by the sub-pixels around which no light blocking layer BM may be disposed in any direction may not be blocked. Accordingly, a problem of a fine pattern occurring in a region in which light blocking layers BM are disposed around all the sub-pixels SP that are arranged in the same direction and emit light of the same color may be prevented.

Figure 13:
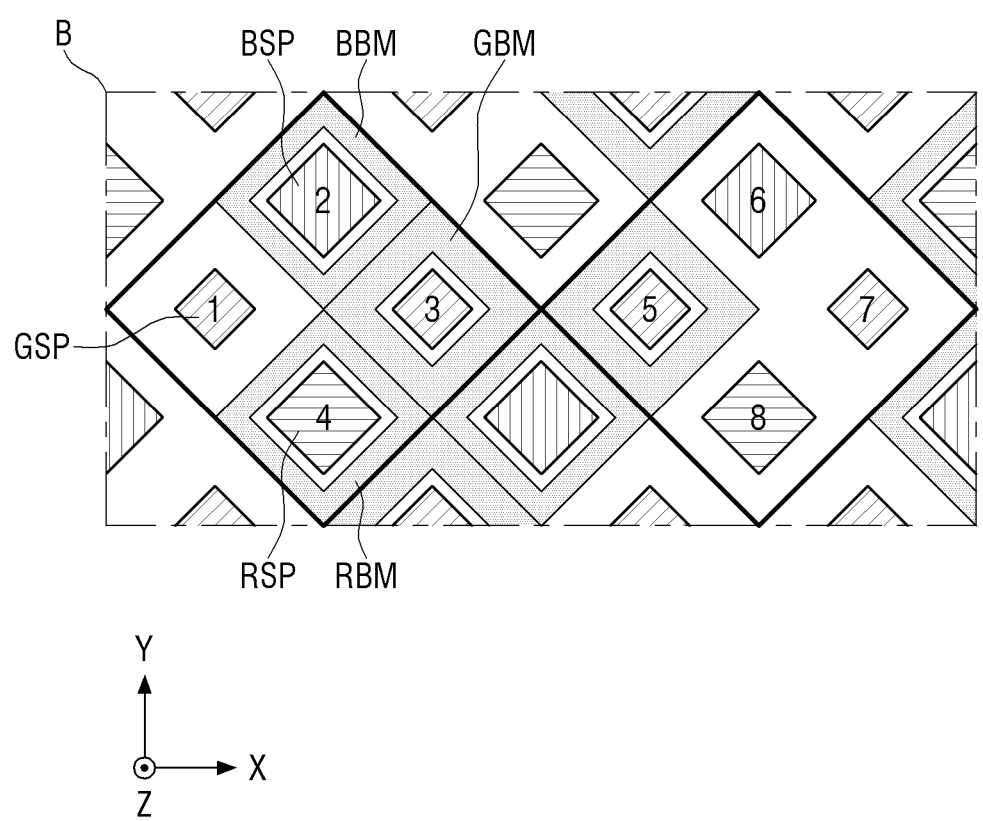
FIG. 13 is an enlarged schematic view of portion B of FIG. 9.

FIG. 13 is an enlarged schematic view of portion B of FIG. 9.

FIG. 13 illustrates eight sub-pixels SP.

Referring to FIG. 13, the display panel 10 may include a unit of eight sub-pixels SP. As shown in FIG. 13, positions of the eight sub-pixels SP are defined as a first position, a second position, a third position, a fourth position, a fifth position, a sixth position, a seventh position, and an eighth position, respectively. A green sub-pixels GSP may be disposed at the first position, the third position, the fifth position, and the seventh position, a blue sub-pixel BSP may be disposed at the second position and the sixth position, and a red sub-pixel RSP may be disposed at the fourth position and the eighth position.

The green sub-pixels GSP disposed at the third and fifth positions may include a light blocking layer BM, and the green sub-pixels GSP disposed at the first and seventh positions may not include a light blocking layer BM. Accordingly, the light blocking layers BM may be disposed around some of the green sub-pixels GSP adjacent in the first direction X.

The blue sub-pixel BSP disposed at the second position may include a light blocking layer BM, and the blue sub-pixel BSP disposed at the sixth position may not include a light blocking layer BM. Accordingly, the light blocking layers BM may be disposed around some of the blue sub-pixels BSP adjacent in the first direction X.

The red sub-pixel BSP disposed at the fourth position may include a light blocking layer BM, and the red sub-pixel RSP disposed at the eighth position may not include a light blocking layer BM. Accordingly, the light blocking layers BM may be disposed around some of the red sub-pixels RSP adjacent in the first direction X.

Figure 14:
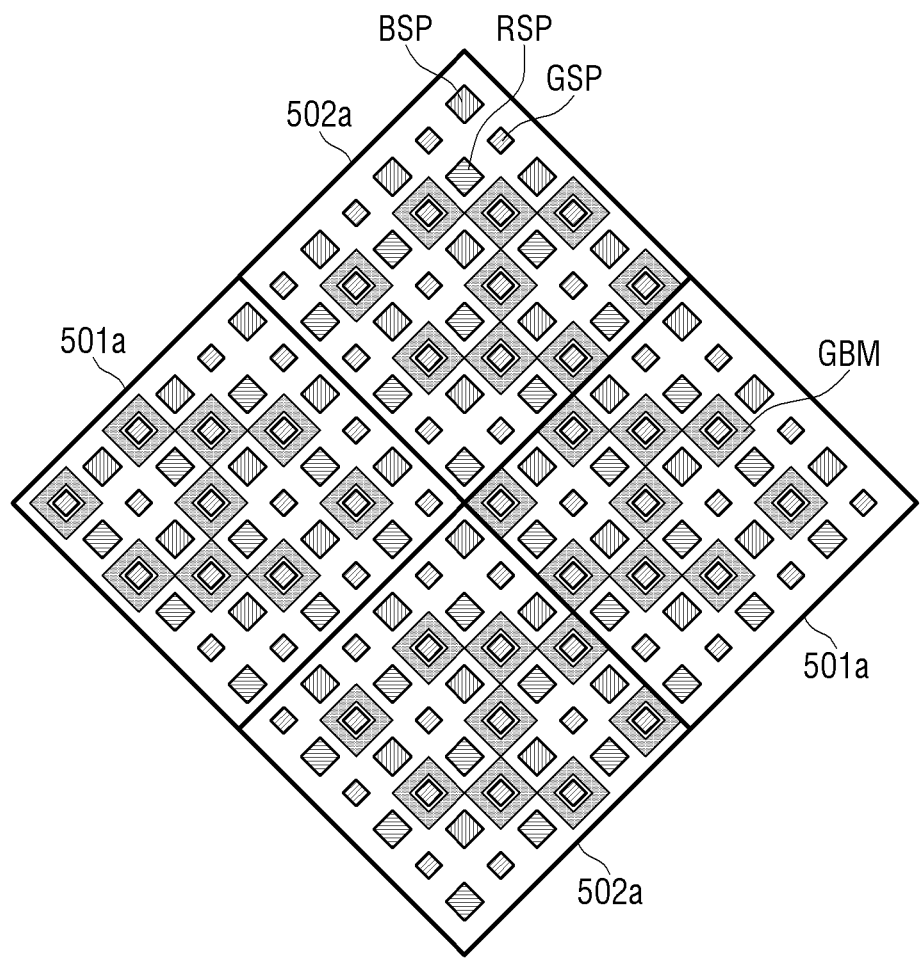
FIG. 14 is a schematic plan view showing the arrangement of pixels and light blocking layers of a display device according to another embodiment.

FIG. 14 is a schematic plan view showing the arrangement of pixels and a light blocking layer of a display device according to another embodiment.

The display device 1 according to an embodiment may be different from an embodiment shown in FIG. 9 in the arrangement of the light blocking layer BM in a plan view.

Referring to FIG. 14, the light blocking layer BM may have a structure in which two light blocking patterns may be repeatedly disposed. The two light blocking patterns may include a first light blocking pattern 501a and a second light blocking pattern 502a. In the drawing, two adjacent first light blocking patterns 501 may be disposed to share one vertex with each other in the first direction X, and two adjacent second light blocking patterns may be disposed to share one vertex with each other in the second direction Y. The first light blocking pattern 501a and the second light pattern may be adjacent to each other in a direction between the first direction X and the second direction Y, a direction between the first direction X and a direction opposite to the second direction Y, a direction between a direction opposite to the first direction X and the second direction Y, or a direction between a direction opposite to the first direction X and a direction opposite to the second direction Y.

Each of the first light blocking pattern 501a and the second light blocking pattern 502a may include thirty-six sub-pixels SP. Green light blocking layers BM included in the first light blocking pattern 501a and green light blocking layers BM included in the second light blocking pattern 502a may be disposed as shown in the drawing. In the first light blocking pattern 501a and the second light blocking pattern 502a, the green light blocking layers BM may not be continuously arranged around all green sub-pixels GSP in any one of the first direction X, the second direction Y, and a direction between the first direction X and the second direction Y. In other words, at least one green sub-pixel GSP around which no light blocking layer BM may be arranged in the first direction X, the second direction Y, and the direction between the first direction X and the second direction Y may be disposed in the light blocking pattern 500.

Although only the green light blocking layers BM are illustrated in the drawing, blue light blocking layers BM and red light blocking layers BM may also be arranged to not be continuous with each other in a specific direction. Accordingly, in a large viewing angle environment, even in case that the light emitted by the sub-pixels SP around which the light blocking layers BM are disposed may be blocked, the light emitted by the sub-pixels around which no light blocking layer BM may be disposed in any direction may not be blocked. Accordingly, a problem of a fine pattern occurring in a region in which light blocking layers BM are disposed around all the sub-pixels SP that are arranged in the same direction and emit light of the same color may be prevented.

However, the effects of the embodiments are not restricted to the those set forth herein. The above and other effects of the embodiments will become more apparent to one of ordinary skill in the art to which the embodiments pertain.

Features of various embodiments of the disclosure may be combined partially or totally. As will be clearly appreciated by those skilled in the art, technically various interactions and operations are possible. Various embodiments can be practiced individually or in combination.

In concluding the detailed description, those skilled in the art will appreciate that many variations and modifications can be made to the embodiments without substantially departing from the principles of the disclosure. Therefore, the disclosed embodiments are used in a generic and descriptive sense only and not for purposes of limitation.

What is claimed is:

1. A display device comprising:
a substrate;
a pixel disposed on the substrate and that emits light;
a light blocking layer disposed on the pixel and that blocks light;
a first pixel row comprising a first pixel group including multiple color subpixels and a second pixel group including multiple color subpixels, the first pixel group and the second pixel group arranged in a first direction in a plan view; and
a second pixel row disposed in a second direction that intersects the first direction and comprising a third pixel group including multiple color subpixels and a fourth pixel group including multiple color subpixels the third pixel group and the fourth pixel group arranged in the first direction, wherein
the first pixel group including multiple color subpixels comprises a first sub-pixel, a second sub-pixel disposed in a third direction from the first sub-pixel, the third direction intersecting the first direction, and a third sub-pixel disposed in the first direction from the first sub-pixel,
the third pixel group including multiple color subpixels comprises a sixth sub-pixel, a seventh sub-pixel disposed in the third direction from the sixth sub-pixel, and an eighth sub-pixel disposed in the first direction from the sixth sub-pixel and
the third pixel group including multiple color subpixels is surrounded by the light blocking layer and the first pixel group including multiple color subpixels is not surrounded by the light blocking layer.

2. The display device of claim 1, wherein
the second pixel group including multiple color subpixels comprises a third sub-pixel, a fourth sub-pixel disposed in the third direction from the third sub-pixel, and a fifth sub-pixel disposed in the first direction from the third sub-pixel, and
the fourth pixel group including multiple color subpixels comprises the eighth sub-pixel, a ninth sub-pixel disposed in the third direction from the eighth sub-pixel, and a tenth sub-pixel disposed in the first direction from the eighth sub-pixel.

3. The display device of claim 2, wherein the first pixel group including multiple color subpixels and the second pixel group including multiple color subpixels are alternately disposed in the first pixel row in the first direction.

4. The display device of claim 2, wherein the fourth pixel group including multiple color subpixels is surrounded by the light blocking layer.

5. The display device of claim 4, wherein the third pixel group including multiple color subpixels and the fourth pixel group including multiple color subpixels are alternately disposed in the second pixel row in the first direction.

6. The display device of claim 2, wherein the second sub-pixel, the fourth sub-pixel, the seventh sub-pixel, and the ninth sub-pixel emit light of a same color.

7. The display device of claim 2, wherein the first sub-pixel, the fifth sub-pixel, and the eighth sub-pixel emit light of a same color.

8. The display device of claim 2, wherein the third sub-pixel, the sixth sub-pixel, and the tenth sub-pixel emit light of a same color.

9. The display device of claim 8, wherein the first sub-pixel and the sixth sub-pixel emit light of different colors from each other.

10. The display device of claim 1, wherein the first pixel row and the second pixel row are alternately disposed in the second direction.

11. The display device of claim 1, wherein
the first pixel row is in an on state in a first mode and in an off state in a second mode, and
the second pixel row is in the on state in both the first and second modes.

12. The display device of claim 11, wherein each of the first pixel group including multiple color subpixels, the second pixel group including multiple color subpixels, the third pixel group including multiple color subpixels, and the fourth pixel group including multiple color subpixels are driven as a unit.

13. The display device of claim 12, wherein the first pixel group including multiple color subpixels comprises:
a sub-pixel that emits light of red color;
a sub-pixel that emits light of blue color; and
a sub-pixel that emits light of green color.

14. The display device of claim 13, wherein the second sub-pixel emits light of green color.

15. A display device comprising:
a substrate;
a pixel disposed on the substrate and that emits light;
a light blocking layer disposed on the pixel and that blocks light;
a first pixel group including multiple color subpixels and comprising a first sub-pixel, a second sub-pixel, a third sub-pixel, and a fourth sub-pixel; and
a second pixel group including multiple color subpixels, the second pixel group disposed in a first direction from the first pixel group and comprising a fifth sub-pixel, a sixth sub-pixel, a seventh sub-pixel, and an eighth sub-pixel, wherein
the second sub-pixel is disposed in a second direction from the first sub-pixel, the second direction intersecting the first direction,
the third sub-pixel is disposed in a third direction from the second sub-pixel, the third direction intersecting the second direction,
the fourth sub-pixel is disposed in the third direction from the first sub-pixel,
the sixth sub-pixel is disposed in the second direction from the fifth sub-pixel,
the seventh sub-pixel is disposed in the third direction from the sixth sub-pixel,
the eighth sub-pixel is disposed in the third direction from the fifth sub-pixel,
at least one sub-pixel of a plurality of sub-pixels disposed in the first pixel group and the second pixel group in the first direction is disposed to be spaced apart from the light blocking layer in a plan view, and
at least a plurality of the multiple color subpixels of the first pixel group are surrounded by the light blocking layer and at least a plurality of the multiple color subpixels of the second pixel group are not surrounded by the light blocking layer.

16. The display device of claim 15, wherein the third sub-pixel and the fifth sub-pixel are disposed adjacent to each other in the first direction.

17. The display device of claim 16, wherein the second sub-pixel, the third sub-pixel, the fourth sub-pixel, and the fifth sub-pixel are surrounded by the light blocking layer in a plan view.

18. The display device of claim 17, wherein the first sub-pixel, the third sub-pixel, the fifth sub-pixel, and the seventh sub-pixel emit light of green color.

19. The display device of claim 17, wherein
the second sub-pixel and the sixth sub-pixel emit light of a same color, and
the fourth sub-pixel and the eighth sub-pixel emit light of a same color.

20. The display device of claim 17, wherein the second sub-pixel and the fourth sub-pixel emit light of different colors from each other.

* * * * *